United States Patent
Ghotgalkar et al.

(10) Patent No.: US 12,418,391 B2
(45) Date of Patent: Sep. 16, 2025

(54) COMMUNICATION INTERFACE WITH CALIBRATING DELAY CIRCUIT

(71) Applicant: Texas Instruments Incorporated, Dallas, TX (US)

(72) Inventors: Shailesh Ganapat Ghotgalkar, Bangalore (IN); Mihir Narendra Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 103 days.

(21) Appl. No.: 18/531,638

(22) Filed: Dec. 6, 2023

(65) Prior Publication Data

US 2025/0192975 A1    Jun. 12, 2025

(51) Int. Cl.
| | | |
|---|---|---|
| H04L 7/00 | (2006.01) | |
| H04L 7/033 | (2006.01) | |
| H04L 25/00 | (2006.01) | |
| H04L 25/40 | (2006.01) | |

(52) U.S. Cl.
CPC .......... H04L 7/0037 (2013.01); H04L 7/0337 (2013.01)

(58) Field of Classification Search
CPC ... H04L 7/0037; H04L 7/0337; G11C 29/028; G06F 1/10; H03L 7/0805; H03L 7/1075
USPC .......... 375/371, 375, 373, 354, 356
See application file for complete search history.

(56) References Cited

U.S. PATENT DOCUMENTS

| | | | |
|---|---|---|---|
| 2019/0007052 A1* | 1/2019 | Nelson | H03L 7/1075 |
| 2019/0007055 A1* | 1/2019 | Nelson | G06F 1/10 |
| 2020/0076439 A1* | 3/2020 | Weeks | H03L 7/0805 |
| 2022/0043760 A1* | 2/2022 | Brown | G11C 29/028 |

* cited by examiner

*Primary Examiner* — Phuong Phu
(74) *Attorney, Agent, or Firm* — Carl G. Peterson; Frank D. Cimino (57) ABSTRACT

In described examples, a device includes a transmitter, a receiver, and a control circuit. The transmitter transmits a clock signal, and the receiver receives a response signal. The control circuit is coupled to the transmitter and the receiver. The control circuit causes the transmitter to transmit a first clock signal with a first clock period, and to transmit a second clock signal with a second clock period greater than the first clock period. The control circuit determines whether a first pattern of a signal responsive to the first clock signal is the same as a second pattern of a signal responsive to the second clock period. If the patterns are the same, the control circuit delays the clock signal with a delay responsive to the first clock period to generate a delayed clock signal. The receiver samples response signals using the delayed clock signal during normal operation of the device.

20 Claims, 8 Drawing Sheets

COMMUNICATION INTERFACE WITH CALIBRATING DELAY CIRCUIT

TECHNICAL FIELD

This application relates generally to communications interfaces, and more particularly to compensating for round trip delay in short range communications interfaces.

BACKGROUND

Serial Peripheral Interface (SPI) is a serial communication interface, used for example in embedded systems for short-distance wired communication between integrated circuits (ICs). In some examples, microcontrollers use SPI to communicate with secure digital (SD) card readers, radio frequency identification (RFID) card readers, and 2.4 gigahertz (GHz) wireless transmitters and receivers. SPI enables high speed synchronous communication, that is, simultaneous communication from a main to a subnode, and from the subnode to the main.

SUMMARY

In described examples, a device includes a transmitter, a receiver, and a control circuit. The transmitter transmits a clock signal, and the receiver receives a response signal. The control circuit is coupled to the transmitter and the receiver. The control circuit causes the transmitter to transmit a first clock signal with a first clock period, and to transmit a second clock signal with a second clock period greater than the first clock period. The control circuit determines whether a first pattern of a signal responsive to the first clock signal is the same as a second pattern of a signal responsive to the second clock period. If the patterns are the same, the control circuit delays the clock signal with a delay responsive to the first clock period to generate a delayed clock signal. The receiver samples response signals using the delayed clock signal during normal operation of the device.

DETAILED DESCRIPTION

An SPI main transmits a data signal to an SPI subnode with a chip select (CS) signal that selects the SPI subnode intended to receive the data signal, and with an SPI clock (SCLK) signal that has a frequency corresponding to the data rate of the data signal. A receiver circuit of the SPI main samples response signals received from the SPI subnode using the SCLK signal. The response signal is received by the SPI main with some amount of round trip delay (RTD) from the leading edge of the transmitted SCLK signal to receipt of the response signal. In some examples, RTD is responsive to the time from assertion of the CS signal to receipt of the response signal.

An example SPI main reduces errors that may occur due to improper timing of the receipt of the SCLK signal that might otherwise occur. If the SPI main receiver circuit receives the SCLK signal too soon, the receiver may sample line noise or pattern that does not correspond to the response signal. If the SPI main receiver receives the SCLK signal too late, the receiver may fail to sample portions of the response signal. Too soon corresponds to substantially less time than the RTD, and too late corresponds to substantially more time than the RTD. Accordingly, an example SPI main includes a delay circuit configured to add an amount of delay equal to the RTD to the SCLK signal before the SCLK signal is passed to the SPI main receiver for sampling the response signal. This added delay may enable the SCLK signal to reach the SPI main receiver at the correct time (neither too soon, nor too late) to sample the response signal.

The SPI delay circuit may include both coarse and fine delay calibrations. A coarse initial delay calibration can be performed to determine an initial value of the RTD by varying a frequency of the SCLK signal and comparing RTD to a period of the SCLK signal. A fine initial delay calibration can be performed using a sequential search or a binary search within a potential range for the RTD determined by the coarse calibration. The resulting determined RTD is applied by the delay circuit to SCLK signals used to sample response signals from the corresponding SPI subnode.

The delay provided by the delay circuit can be calibrated on an ongoing basis, such as continuously, using a delay calibration maintenance process. The delay calibration maintenance process accumulates measured RTD for multiple different response signals from a corresponding SPI subnode, averages the measured RTD, and compares a difference between the averaged RTD and the currently applied RTD to a threshold to determine whether to replace the currently applied delay. If the difference exceeds the threshold, the delay calibration maintenance process includes applying a new RTD, responsive to or based on the averaged RTD, to SCLK signals used to sample response signals from the corresponding SPI subnode, replacing (updating) the currently applied delay.

Herein, some structures or signals that are distinct but related have reference numbers that use a [number][letter] format, such as SPI subnodes 104a, 104b, and 104c. In some examples, these structures or signals are referred to generally, in the singular or as a group, using the [number] and without the [letter], such as the SPI subnodes 104. Also, the same reference numbers or other reference designators are used in the drawings to designate features that are related structurally and/or functionally.

Figure 1A:
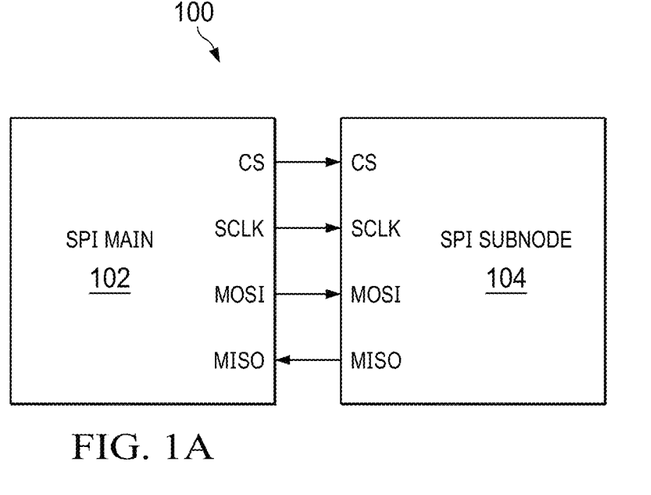
FIG. 1A is a functional block diagram of a first example SPI system in an automotive or industrial context, including an SPI main node and an SPI subnode.

FIG. 1A is a functional block diagram of an example SPI system 100 in an automotive or industrial context, including an SPI main 102 and an SPI subnode 104. The SPI main 102 and the SPI subnode 104 are separate ICs. The SPI main 102 includes a CS output that provides a CS signal, an SCLK output that provides an SCLK signal with an SCLK frequency, a main out subnode in (MOSI) output that provides a MOSI data signal to the SPI subnode 104, and a main in subnode out (MISO) output that receives a MISO data signal from the SPI subnode 104. The SPI subnode 104 includes a CS input that receives the CS signal, an SCLK input that receives the SCLK signal, a MOSI input that receives the MOSI data signal, and a MISO output that provides the MISO data signal.

The SPI main 102 generates the MOSI data signal so that it is synchronized to the SCLK signal. Accordingly, the SPI subnode 104 reads (for example, samples) the MOSI data signal using the SCLK signal. In some examples, the MOSI data signal corresponds to instructions for the SPI subnode 104. The SPI subnode 104 provides the MISO data signal in response to these instructions. In some examples, the MISO data signal includes data read from a memory of the SPI subnode 104 or data generated by a sensor fabricated as part of the SPI subnode 104. In some examples, a sensor that is part of the SPI subnode 104 includes a temperature, pressure, voltage, or current sensor, such as for an armature current on a motor or for a motor drive control, or a signal decoder such as for a device start signal or other input/output signal, or a wireless fidelity (WiFi) or radio frequency receiver signal chain connected to an on-board or on-chip receiver antenna.

In some examples, the SPI subnode 104 is able to provide a MISO signal responsive to the SCLK signal, without requiring a MOSI data signal. For example, an SPI subnode 104 that includes a first in first out (FIFO) memory (not shown) that serially reads out one bit of sensor-captured data in response to each successive rising (or falling) edge of the SCLK signal. Accordingly, because a MISO data signal is responsive to a MOSI data signal or the SCLK signal, and the MOSI data signal is synchronized to the SCLK signal, the MISO data signal is referred to herein as responsive to the SCLK signal.

Figure 1B:
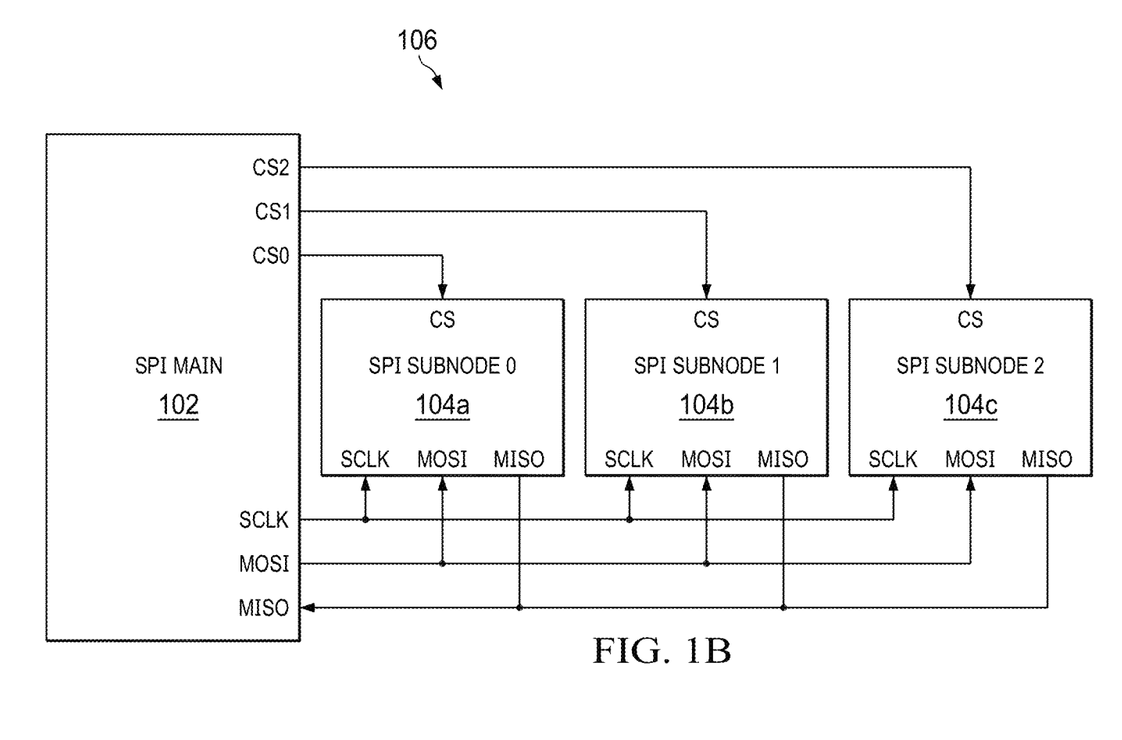
FIG. 1B is a functional block diagram of a second example SPI system.

FIG. 1B is a functional block diagram of a second example SPI system 106. The second SPI system 106 includes an SPI main 102, a first SPI subnode (SPI subnode 0) 104a, a second SPI subnode (SPI subnode 1) 104b, and a third SPI subnode (SPI subnode 2) 104c. A first CS output (CS0) of the SPI main 102 is connected to a CS input of SPI subnode 0 104a. A second CS output (CS1) of the SPI main 102 is connected to a CS input of SPI subnode 1 104b. A third CS output (CS2) of the SPI main 102 is connected to a CS input of SPI subnode 2 104c.

The SCLK output of the SPI main 102 is connected to the respective SCLK inputs of SPI subnodes 0, 1, and 2 (104a, 104b, and 104c). The MOSI output of the SPI main 102 is connected to the respective MOSI inputs of SPI subnodes 0, 1, and 2 (104a, 104b, and 104c) by a bus. The MISO input of the SPI main 102 is also connected to the respective MISO outputs of SPI subnodes 0, 1, and 2 (104a, 104b, and 104c) by a bus. Data can be transmitted between MOSI ports simultaneously with data being transmitted between MISO ports. Accordingly, SPI is a full duplex interface.

To begin SPI communication, the SPI main 102 sends the SCLK signal and selects an SPI subnode 104 by enabling a corresponding CS signal, such as a CS signal provided by the CS0 output, the CS1 output, or the CS2 output. In some examples, the CS signal is active low, while in other examples, the CS signal is active high. Selecting an SPI subnode 104 by enabling a corresponding CS signal determines which SPI subnode 104 is activated to provide a signal responsive to the SCLK signal. In some examples, the MOSI data signal represents instructions to be executed by, control signals for, or configuration parameters for the selected SPI subnode 104.

In some examples, a mode of SPI operation can be selected so that either rising or falling edges of the SCLK signal are used for sampling the MOSI data signal and shifting data out of a memory (such as a FIFO memory) onto the MISO output of the corresponding SPI subnode 104. Accordingly, either rising or falling edges of the MOSI data signal can represent data, depending on mode. The SPI main 102 similarly samples the received MISO data signal responsive to mode-dependent edges of the SCLK signal.

Figure 2:
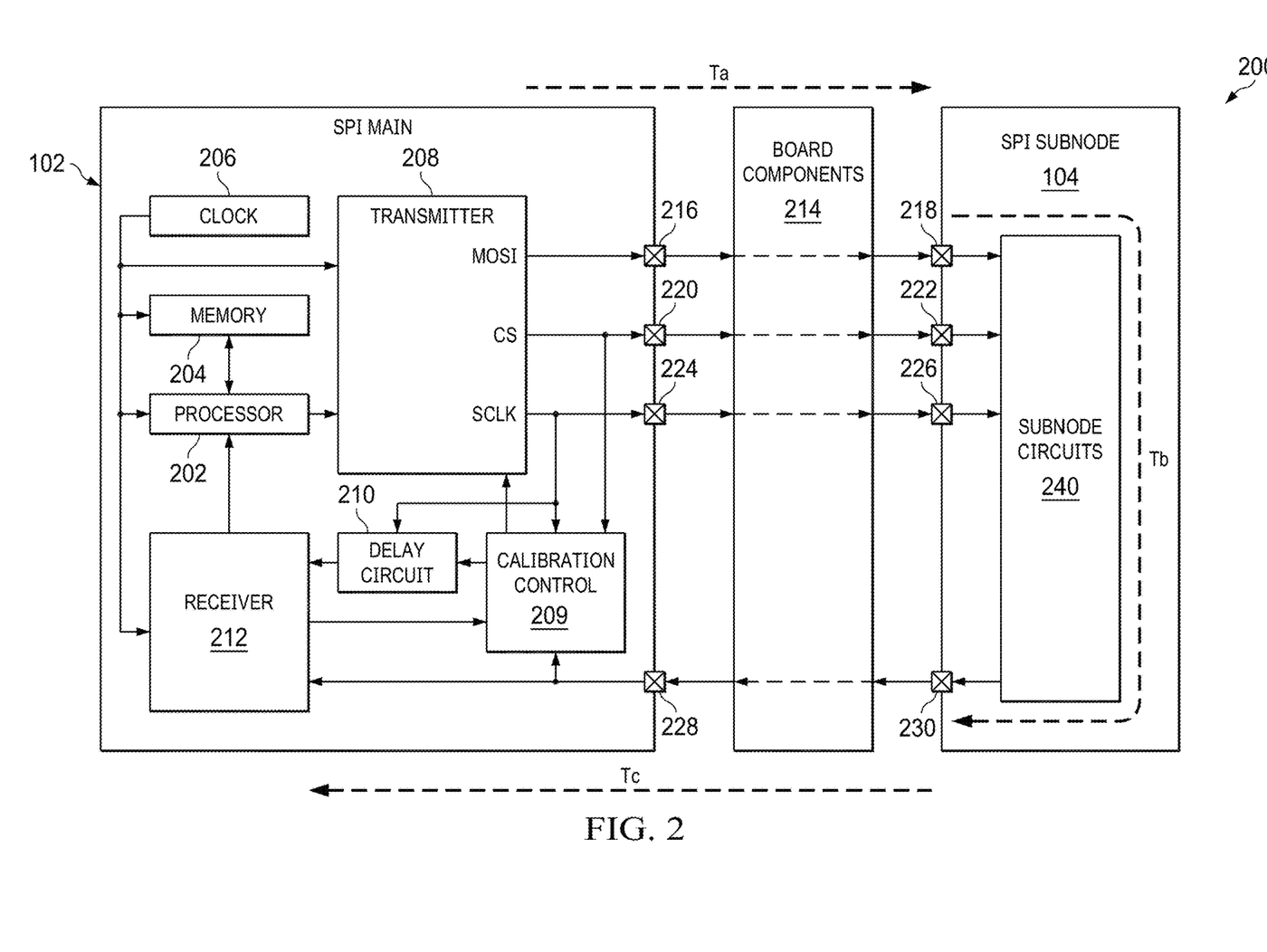
FIG. 2 is a functional block diagram of a third example SPI system.

FIG. 2 is a functional block diagram of a third SPI system 200. The SPI system 200 of FIG. 2 may be fabricated on a printed circuit board (PCB), and includes an SPI main 102, an SPI subnode 104, and other board components 214. The SPI main 102 includes a processor 202 such as a microcontroller, a memory 204, a clock 206 providing a clock signal with a reference frequency, a transmitter 208, a calibration control circuit 209, a delay circuit 210, and a receiver 212. An example delay circuit 210 is described with respect to FIG. 5. The SPI subnode 104 includes various subnode circuits 240.

The subnode circuits 240 include, for example, CS circuits to activate the SPI subnode 104 in response to a CS signal with an ENABLE value, sampling circuits to sample the MOSI data signal, sensor circuits, and transmitter circuits to transmit a responsive signal to the SPI main 102. The board components 214 include, for example, galvanic isolators, such as optical, inductive, or capacitive galvanic isolators.

The clock 206 is connected to, and provides the clock signal to, the processor 202, the memory 204, the transmitter 208, and the receiver 212. The processor 202 is bidirectionally connected to request and receive data from the memory 204, to control the transmitter 208, and to provide data or a cue to the transmitter 208 to initiate transmission to an SPI subnode 104. The calibration control circuit 209 is connected to control the transmitter 208, and is connected to control the delay circuit 210. The receiver 212 is connected to provide to the processor 202 data extracted from a received MISO data signal. The receiver 212 is also connected to provide timing of received data signals to the calibration control circuit 209.

The transmitter 208 includes circuits for generating the MOSI data signal in response to the clock signal and the data provided by the processor 202, and generating the CS signal in response to SPI subnode 104 selection information provided by the processor 202. The transmitter 208 also includes circuits for receiving the clock signal provided by the clock 206, and conditioning the clock signal to generate the SCLK signal. In some examples, this includes level shifting the clock signal, or multiplying or dividing the frequency of the clock signal, or phase shifting the clock signal, to correspond to a level, frequency, and phase of the MOSI data signal, or of a clock signal configured to clock a target SPI subnode 104, or in response to control by the calibration control circuit 209. In some examples, the transmitter 208 synchronizes edges of the SCLK signal used to sample and shift the MOSI data signal with edges of the MOSI data signal that represent data (or synchronizes edges of the MOSI data signal with edges of the SCLK signal).

A MOSI output of the transmitter 208 is connected to a MOSI pin 216 of the SPI main 102. The MOSI pin 216 corresponds to the MOSI output of the SPI main 102. A CS output of the transmitter 208 is connected to a CS input of the calibration control circuit 209 and to a CS pin 220 of the SPI main 102, which corresponds to the CS output of the SPI main 102. An SCLK output of the transmitter 208 is connected to an SCLK input of the calibration control circuit 209, a clock input of the delay circuit 210, and an SCLK pin 224 of the SPI main 102. The SCLK pin 224 corresponds to the SCLK output of the SPI main 102. An output of the delay circuit 210 is connected to a clock input of the receiver 212.

The MOSI pin 216 of the SPI main 102 is connected to a MOSI pin 218 of the SPI subnode 104 via the board components 214. The CS pin 220 of the SPI main 102 is connected to a CS pin 222 of the SPI subnode 104 via the board components 214. The SCLK pin 224 of the SPI main 102 is connected to an SCLK pin 226 of the SPI subnode 104 via the board components 214. In some examples, the board components 214 (and/or off-board components in a circuit path) introduce a significant delay to the MOSI data signal transmitted from the MOSI output of the transmitter 208 to the MOSI pin of the SPI subnode 104. For example, galvanic isolation, such as between different voltage domains with mutually isolated grounds, can introduce significant signal delay. In some examples, delay can be between two and twenty nanoseconds. This transmission delay from the SPI main 102 to the SPI subnode 104 is referred to as Ta. Ta can also be referred to as the time taken for transmission of a leading edge of the SCLK signal from the SPI main 102 to the SPI subnode 104.

The MOSI pin 218, CS pin 222, and SCLK pin 226 of the SPI subnode 104 are connected to respective inputs of the subnode circuits 240. An output of the subnode circuits 240 is connected to a MISO pin 230 of the SPI subnode 104. If the CS signal corresponds to the SPI subnode 104 being selected and activated, the subnode circuits 240 process the SCLK signal received at the SCLK pin 226, and in some examples, process a MOSI signal received via the MOSI pin 218 in response to the SCLK signal. In response to the received signal(s), the SPI subnode 104 provides a resulting output signal to its MISO pin 230. This output signal is provided to the MISO pin 230 with a delay (a total processing time) Tb with respect to receipt of a leading edge of the SCLK signal at the SCLK pin 226.

The MISO pin 230 of the SPI subnode 104 is connected to the MISO pin 228 of the SPI main 102 via the board components 214. The MISO pin 228 is connected to a data input of the calibration control circuit 209, and to a data input of the receiver 212. The receiver 212 processes the received MISO data signal in response to a delayed SCLK signal provided by the delay circuit 210 to the clock input of the receiver 212.

A delay in transmission of the MISO data signal to the delay circuit 210 (or the receiver 212) is Tc. Accordingly, an RTD from the SPI main 102 transmitting an SCLK signal to an SPI subnode 104, to the SPI main 102 receiving a responsive data signal from the SPI subnode 104, is given by RTD=Ta+Tb+Tc. RTD is measured from assertion of the CS signal (enabling a corresponding SPI subnode 104) to the first output data toggle (rising or falling edge, depending on SPI mode) detected by the receiver 212.

The receiver 212 samples the received MISO data signal using the SCLK signal to extract the data transmitted by the SPI subnode 104. The SCLK signal corresponds to the particular MISO data signal responsive to the SCLK signal transmitted by the SPI main 102. As described above, if the SCLK signal arrives at the receiver 212 before the MISO data signal, the receiver 212 may sample line noise. In some examples, ignoring noise uses processor time and power.

Accordingly, the calibration control circuit 209 controls the delay circuit 210 to add a delay to the SCLK signal provided to the receiver 212. The calibration control circuit 209 calibrates the delay to equal the RTD. Calibration of the delay is described with respect to FIGS. 3, 4A, and 4B.

Figure 3:
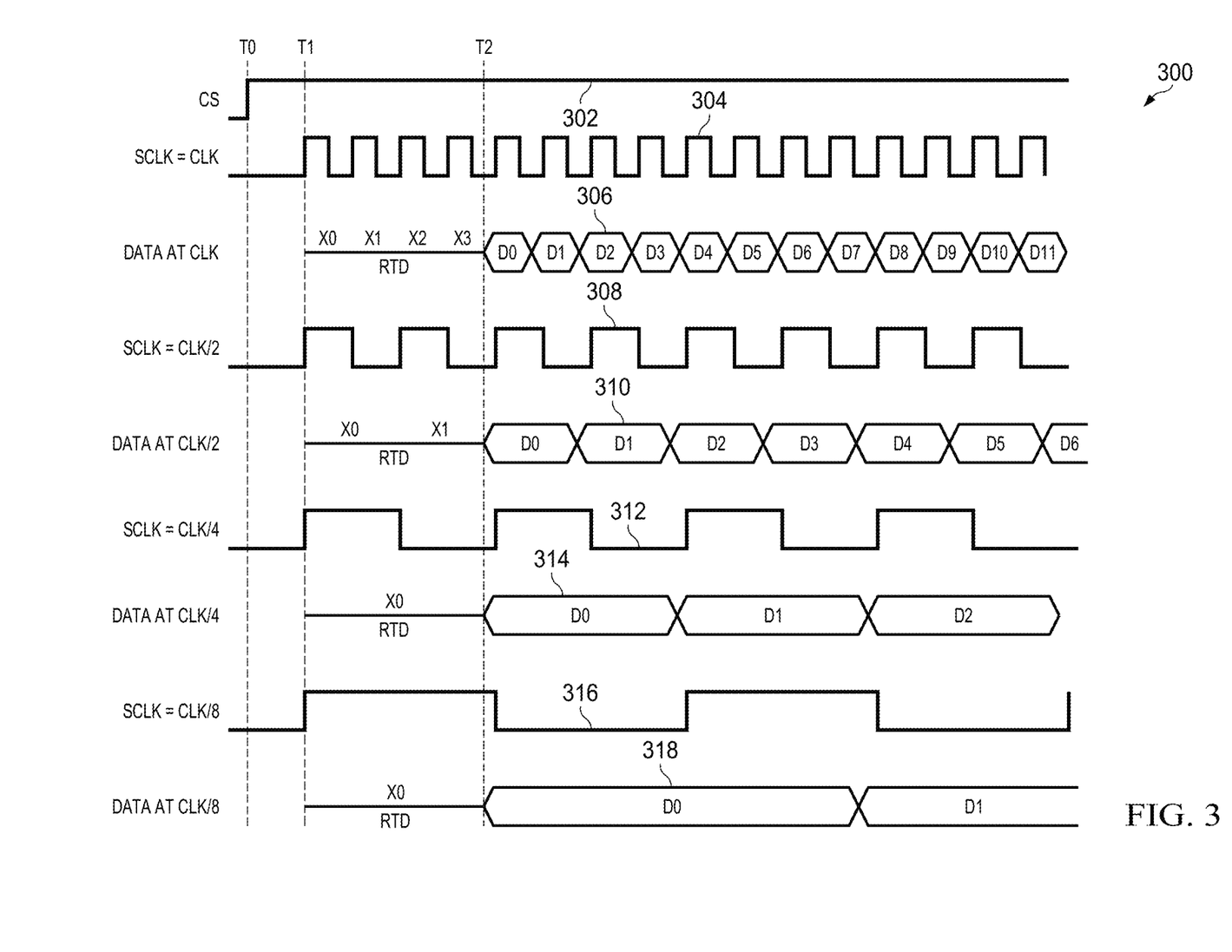
FIG. 3 is a timing diagram of example signals generated by a clock signal delay calibration process of the SPI system of FIG. 2.

FIG. 3 is a timing diagram 300 of example signals generated by a clock signal delay calibration process of the SPI system of FIG. 2. In the timing diagram 300, CLK can represent the frequency of the clock signal generated by the clock 206, or a different clock rate, such as a highest frequency clock rate usable with respect to a corresponding SPI subnode 104.

The timing diagram 300 includes a CS signal 302, multiple SCLK signals 304, 308, 312, and 316, and multiple MISO data signals 306, 310, 314, and 318. The SCLK signals 304, 308, 312, and 316 are provided by an SPI main 102. The MISO data signals 306, 310, 314, and 318 are MISO data signals provided by a SPI subnode 104, and are responsive to corresponding SCLK signals 304, 308, 312, and 316 provided by the SPI main 102 to the SPI subnode 104. The MISO data signals 306, 310, 314, and 318 are received by the receiver 212 of the SPI main 102.

The illustrated SCLK signals and responsive MISO data signals include a first SCLK signal 304 with a frequency equal to CLK (SCLK=CLK), a first MISO data signal 306 with a data rate equal to CLK (Data at CLK), a second SCLK signal 308 with a frequency equal to CLK divided by two (SCLK=CLK/2), a second MISO data signal 310 with a data rate equal to CLK divided by two (Data at CLK/2), a third SCLK signal 312 with a frequency equal to CLK divided by four (SCLK=CLK/4), a third MISO data signal 314 with a data rate equal to CLK divided by four (Data at CLK/4), a fourth SCLK signal 316 with a frequency equal to CLK divided by eight (SCLK=CLK/8), and a fourth MISO data signal 318 with a data rate equal to CLK divided by eight (Data at CLK/8).

The CS signal 302 is asserted with an ENABLE value, such as a high level, beginning at T0. An SCLK signal 304, 308, 312, or 316 is provided beginning at T1, after the CS signal 302 is asserted. A time from T0 to T1 is a clock shift assertion delay. In some examples, this delay equals one-half of one period of a signal generated by a highest frequency oscillator of the SPI main 102. In some examples, the highest frequency oscillator of the SPI main 102 is the clock 206, which provides the clock signal used to generate the SCLK signal.

The SPI main 102 receives line noise at its receiver 212 until T2, after which the receiver 212 receives valid data. Line noise, or pattern not corresponding to a MISO data signal responsive to the SCLK signal, is indicated in respective MISO data signals 306, 310, 314, or 318 as X0, X1, X2, etc. Valid data is indicated in respective MISO data signals 306, 310, 314, or 318 as D0, D1, D2, etc.

Figure 4A:
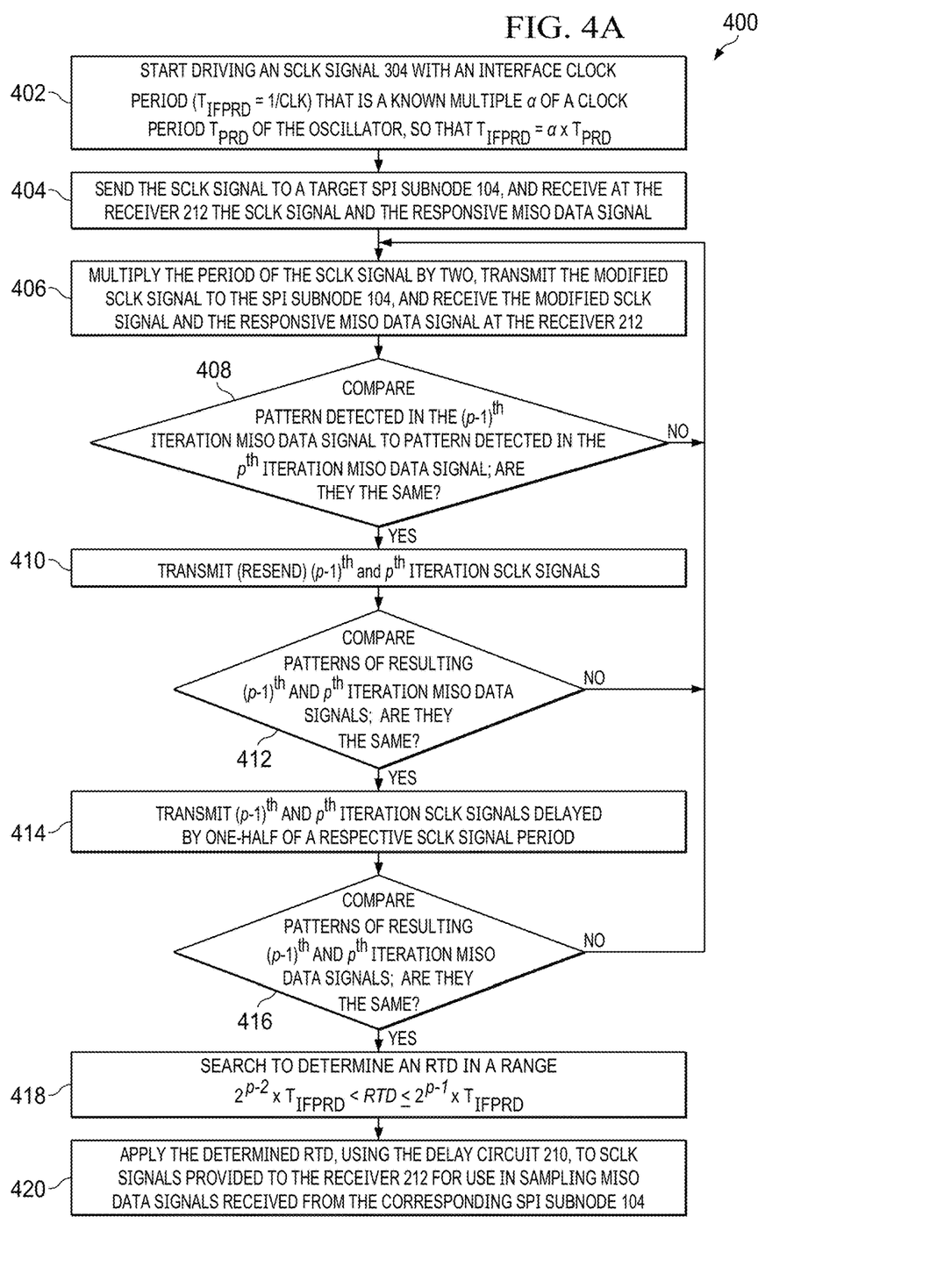
FIG. 4A is an example process for initial calibration of a clock signal delay of the SPI system of FIG. 2.

FIG. 4A is an example process 400 for initial calibration of a clock signal delay of the SPI system 200 of FIG. 2. The process 400 is controlled by the calibration control circuit 209 (in some examples, the processor 202), which controls CS signal timing and SCLK signal frequency and timing for calibration testing, and controls delay added by the delay circuit 210 (both for the process 400 and for normal operation of the SPI main 102). Calibration is performed for RTDs corresponding to transmissions to, and response signals from, a particular one of one or more SPI subnodes 104. Accordingly, there is a different RTD determined by an SPI main 102 for different ones of one or more connected SPI subnodes 104. In some examples, a worst case (longest) RTD determined by the process 400 is used by the SPI main 102 to compensate for RTD for each connected SPI subnode 104. In some examples, an RTDs determined by the process 400 for the connected SPI subnodes 104 are used to compensate for RTD for corresponding SPI subnodes 104. FIG. 3 is further described in parallel with description of steps of the initial calibration process 400.

Referring to FIGS. 3 and 4A, initial delay calibration is performed by measuring RTD.

This is done by determining an SCLK signal frequency so that a response signal is received by the receiver 212 within one period of the SCLK signal 304, 308, 312, or 316. During this test, it is assumed that repeated reads of a same targeted SPI subnode 104 will result in the same responsive MISO signal (accordingly, the same data is being read out of the same memory of the same SPI subnode 104). In step 402, start driving an SCLK signal 304 with an interface clock period ($T_{IFPRD}=1/CLK$) that is a known multiple a of a clock period $T_{PRD}$ of an oscillator (such as the clock 206), so that $T_{IFPRD}=\alpha \times T_{PRD}$. In an example, $T_{PRD}$ is the period of the clock signal provided by the clock 206.

In step 404, the processor 202 causes the transmitter 208 to send the SCLK signal to a corresponding SPI subnode 104, and the receiver 212 receives the SCLK signal and the MISO data signal that the SPI subnode 104 provides in response to the SCLK signal. In some examples, the SCLK signal is provided to the receiver 212 with a delay corresponding to a period of the SCLK signal. The responsive MISO data signal includes at least one data toggle, for example, from logic zero to logic one or from logic one to logic zero. In some examples, data toggle detection is responsive to output from the receiver 212 to the calibration control circuit 209.

In step 406, the period of the SCLK signal is multiplied by two (the frequency is divided by two), the modified SCLK signal is transmitted to the SPI subnode 104, and the receiver 212 receives the SCLK signal and the resulting MISO data signal. Let p be a count of iterations of step 406, where p equals zero for the SCLK signal sent in step 404. SCLK and MISO signals corresponding to a $p^{th}$ iteration of step 406 are referred to herein as $p^{th}$ iteration signals. Steps 408 through 416 test whether one period of the $(p-1)^{th}$ iteration SCLK signal is greater than an RTD for a targeted SPI subnode 104. Accordingly, steps 408 through 416 perform a relatively coarse search for RTD corresponding to the targeted subnode 104. Step 418 performs a relatively fine search for RTD corresponding to the targeted subnode 104, refining the results of steps 408 through 418.

An initial iteration of step 406 corresponds to the second SCLK signal 308 and the second MISO data signal 310. Subsequent iterations of step 406 correspond to the third and fourth (etc.) SCLK signals 312 and 316 and the third and fourth (etc.) MISO data signals 314 and 318.

Accordingly, in a first iteration of step 406, the second SCLK signal 308 and the second MISO data signal 310 have a frequency half that of the first SCLK signal 304 and the first data signal 306 (CLK/2 instead of CLK). Similarly, in a second iteration of step 406, the third SCLK signal 312 and the third data signal 314 have a frequency half that of the second SCLK signal 308 and the second MISO data signal 310 (CLK/4 instead of CLK/2). And signals in the third iteration of step 406 have a frequency half that of signals of the second iteration (CLK/8 instead of CLK/4). In some examples, iterations of step 406 modify the SCLK signal frequency by a factor (or addend, multiplicand, or other modifier) other than division by two.

In step 408, the processor 202 determines whether the $(p-1)^{th}$ iteration response (MISO) signal was received from the SPI subnode 104 within a single period of the $(p-1)^{th}$ iteration SCLK signal. This determination is made by comparing pattern detected in the $(p-1)^{th}$ iteration MISO data signal to pattern detected in the $p^{th}$ iteration MISO data signal. Pattern corresponds to data values detected within a MISO data signal at rising edges of the SCLK signal after a first rising edge, accordingly, logic ones or logic zeroes. (Detection may occur at a first rising edge, if the SCLK signal is provided to the receiver 212 with a delay corresponding to a period of the SCLK signal.)

Herein, pattern comparison is performed by comparing a number of leading bits prior to a first data toggle (transition from a logic one to a logic zero, or from a logic zero to a logic one) in each MISO data signal, and/or comparing bits subsequent to the first data toggle in each MISO data signal. The SCLK signal reads a number of bits from the targeted SPI subnode 104 corresponding to a number of clock cycles in the transmitted SCLK signal. If the period of the SCLK signal is less than the RTD, then one or more leading bits will be read corresponding to line noise. Also, SCLK signals corresponding to different iterations p will read different numbers of leading bits corresponding to line noise. The iteration p–1 and iteration p patterns being the same indicates that neither includes false data corresponding to line noise. In some examples, bits corresponding to line noise may be read as random logic values. If the two patterns are determined to be the same, the result is verified by steps 410 and 412. Otherwise, the process returns to step 406.

In step 410, SCLK signals corresponding to iterations p–1 and p are resent. In step 412, the resulting MISO data signals are compared. If the patterns are again determined to be the same, the process 400 proceeds at step 414, otherwise the process 400 returns to step 406.

Steps 414 and 416 determine edge independence of the pattern match result. In step 414, the $(p-1)^{th}$ and $p^{th}$ iteration SCLK signals are transmitted again by the SPI main 102 with the SCLK signals delayed by one-half of a respective SCLK signal period. Accordingly, the $(p-1)^{th}$ iteration SCLK signal is transmitted to the SPI subnode 104 with a clock shift assertion delay (delay following assertion of the CS signal 302) of $2^{p-2} \times T_{IFPRD}$, and the $p^{th}$ iteration SCLK signal is transmitted to the SPI subnode 104 with a clock shift assertion delay of $2^{p-1} \times T_{IFPRD}$.

In step 416, the response signal patterns are compared. The process 400 proceeds to step 418 if the MISO signal patterns match for the $(p-1)^{th}$ and $p^{th}$ iteration SCLK signals sent in step 414. Otherwise, the process 400 returns to step 406.

If step 416 determines a match, the SCLK period for the $(p-1)^{th}$ iteration, $2^{p-1} \times T_{IFPRD}$, is an upper bound on the RTD for the corresponding SPI subnode 104. Accordingly, $2^{p-2} \times T_{IFPRD} < RTD < 2^{p-1} \times T_{IFPRD}$. In some examples, if (p–1) equals zero for the successful iteration, then the process 400 stops here and the SCLK signal frequency used for step 404 is used as the RTD.

In the illustrated example, the first output signal data toggle (a leading edge of response data) is received within one period of the SCLK signal after step 404 and two iterations of step 406, in which the SCLK frequency equals CLK/4. This is determined in step 408 and verified in steps 410 and 412, and edge independence is confirmed by steps 414 and 416. An iteration providing a determined and verified RTD upper bound is also referred to herein as a successful iteration or successful comparison.

In step 418, a search is performed to determine an RTD in a range $2^{p-2} \times T_{IFPRD} < RTD < 2^{p-1} \times T_{IFPRD}$. In some examples, this search is performed as a binary search or as a sequential search (or using a different search strategy). To perform the search, the SCLK signal is transmitted with a frequency corresponding to the $(p-2)^{th}$ iteration. Accordingly, if p equals two for the successful $(p-1)^{th}$ iteration, so that $T_{IFPRD} < RTD < 2 \times T_{IFPRD}$, the SCLK signal is sent with the CLK frequency, corresponding to SCLK signal 304.

Similarly, if p equals four for the successful iteration, the SCLK signal is sent with frequency CLK/4, corresponding to SCLK signal 312.

For a sequential search, the SCLK signal is provided to the receiver 212 with a delay corresponding to $2^{p-2} \times T_{IFPRD} + k \times$ granular delay. Here, granular delay is a selected delay increment for searching the possible RTD delay space described above, and k is an iterator with a range from one to $2^{p-2} \times T_{IFPRD}/$granular delay. A detected pattern for the responsive MISO data signal for each value of k is compared to a detected pattern for the responsive MISO data signal for a corresponding value of k+1. The test is concluded when a value of k is determined such that one additional bit is read from the MISO data signal in response to k than in response to k+1 (accordingly, the patterns do not match), and values of k higher than k+1 result in MISO data signal pattern that matches the MISO data signal pattern responsive to k+1 (accordingly, the patterns match). When the test concludes, the RTD is responsive to the determined value of k+1, so that $RTD = 2^{p-2} \times T_{IFPRD} + (k+1) \times$ granular delay.

For a binary search, the SCLK signal is provided to the receiver 212 with a delay corresponding to $(2^{p-2} + 2^{p-3}) \times T_{IFPRD}$, accordingly, at the midpoint of the determined range for RTD. The resulting MISO data signal pattern is compared to the MISO data signal pattern for a delay corresponding to $2^{p-1} \times T_{IFPRD}$, the upper bound of the determined range. If one additional bit is read in response to the midpoint delay of the determined range than in response to the upper bound delay of the determined range, then the RTD is within the upper half of the determined range, between the midpoint delay and the upper bound delay. Accordingly, a new midpoint delay is selected between the previous midpoint delay $((2^{p-2} + 2^{p-3}) \times T_{IFPRD})$ and the current upper bound delay, and the previous midpoint delay becomes the new lower bound delay. In this example, the new midpoint delay is $(2^{p-2} + 2^{p-3} + 2^{p-4}) \times T_{IFPRD}$.

Otherwise, the RTD is within the lower half of the determined range, a new midpoint is selected between the previous midpoint delay and the current lower bound delay $(2^{p-2} \times T_{IFPRD})$, and the previous midpoint delay becomes the new upper bound delay. In this example, the new midpoint delay is $(2^{p-2} + 2^{p-3} - 2^{p-4}) \times T_{IFPRD}$.

This process for binary search is repeated to a selected level of granularity between the midpoint delay and the corresponding upper bound delay. The test is concluded when a midpoint delay is determined such that one of the following two cases is true. (1) One additional bit is read from the MISO data signal in response to the lower bound delay than in response to the corresponding midpoint delay (accordingly, the patterns do not match), and delay longer than the midpoint delay results in MISO data signal pattern that matches the MISO data signal pattern responsive to the midpoint delay (accordingly, the patterns match). For case (1), when the test concludes, the RTD is responsive to the determined midpoint delay. (2) Alternatively, one additional bit is read from the MISO data signal in response to the midpoint delay than in response to the corresponding upper bound delay (accordingly, the patterns do not match), and delay longer than the upper bound delay results in MISO data signal pattern that matches the MISO data signal pattern responsive to the upper bound delay (accordingly, the patterns match). For case (2), when the test concludes, the RTD is responsive to the determined upper bound delay.

In step 420, the determined RTD is applied by the delay circuit 210 to SCLK signals provided to the receiver 212 for use in capturing (sampling) response signals received from the corresponding SPI subnode 104, including during normal operation of the SPI system 200.

Figure 4B:
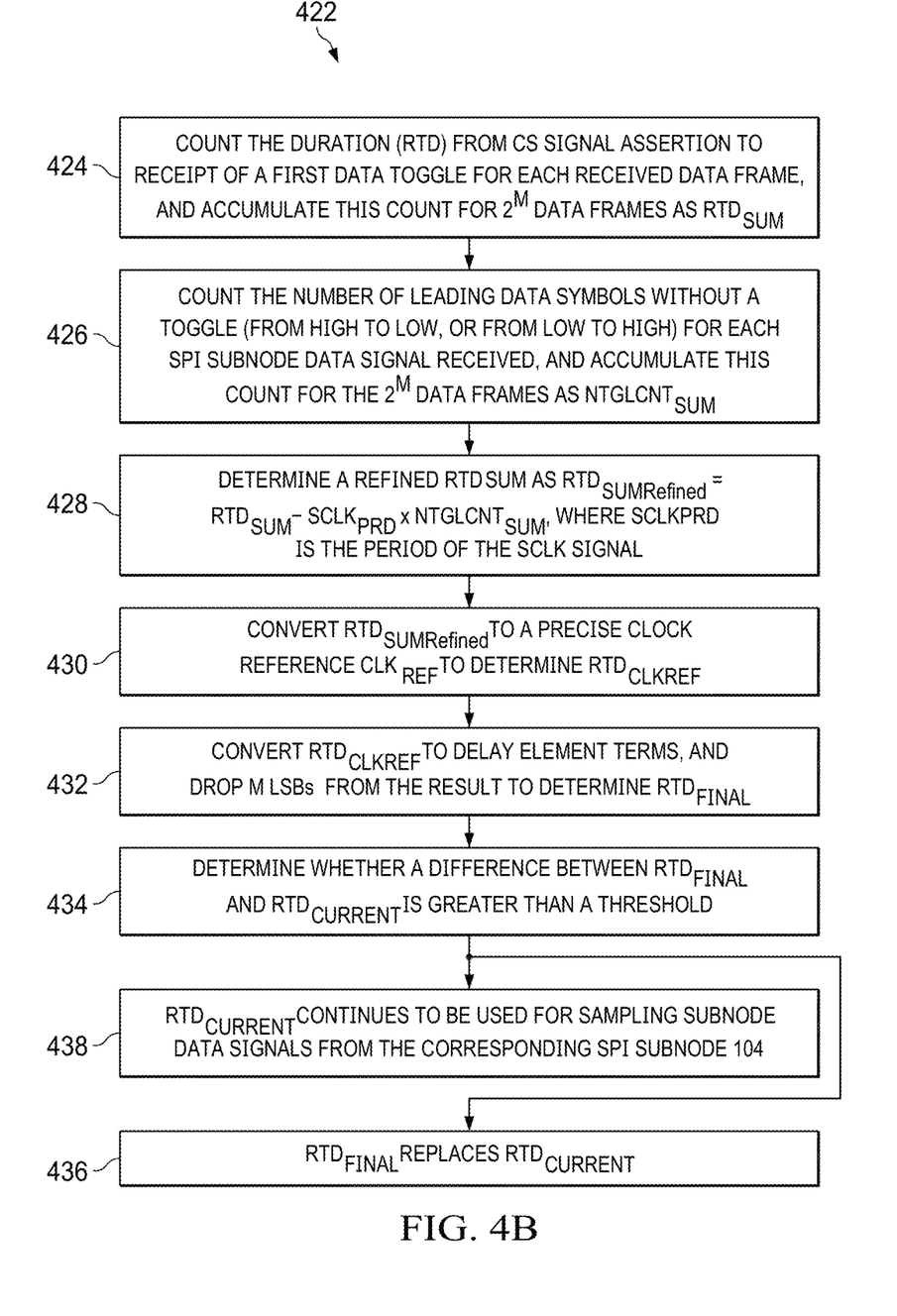
FIG. 4B is an example process for maintaining calibration of a clock signal delay of the SPI system of FIG. 2.

FIG. 4B is an example process 422 for maintaining calibration of a clock signal delay of the SPI system 200 of FIG. 2. The calibration control circuit 209 (in some examples, the processor 202) controls the maintenance delay calibration process 422, including by controlling delay added by the delay circuit 210. Maintenance delay calibration is performed to compensate for changes in RTD following step 420, such as changes caused by variations in temperature and voltage. In some examples, the process 422 is performed continuously during operation of the SPI main 102 to enable continuous delay calibration with respect to RTDs of signals between the SPI main 102 and respective SPI subnodes 104.

In step 424, count the duration from CS signal assertion to a first data toggle (a first edge of pattern after the RTD) for each data frame received by the receiver 212, and accumulate this count for $2^M$ data frames, where M is an integer. Herein, a data frame is a MISO data signal providing a complete response to an SCLK signal sent from the SPI main 102 to the particular SPI subnode 104. This count is maintained by the SPI main 102 separately for separate SPI subnodes 104. In some examples, this delay can be counted as a multiple of a delay provided by a minimum delay element of the delay circuit 210, or as a sum of delay element control codes of the delay circuit 210. This sum is referred to as $RTD_{SUM}$. Accordingly, for $2^M$ data frames, where RTD (a current RTD, $RTD_{CURRENT}$) is expressed as a delay code with an integer N bits, $RTD_{SUM}$ may require up to N+M bits to express.

In step 426, count the number of leading data bits without a toggle (from high to low, or from low to high) for each MISO data signal received, and accumulate this count for the $2^M$ data frames. This count is referred to as $NTGLCNT_{SUM}$ (no toggle count sum). In step 428, a refined sum of RTDs for the data frames is determined by subtracting a bit duration (a signal duration corresponding to one bit) multiplied by $NTGLCNT_{SUM}$ from $RTD_{SUM}$ (the product is expressed in the same units as $RTD_{SUM}$). The duration of each bit equals the period of the SCLK signal, which will be referred to as $SCLK_{PRD}$. Accordingly, the refined sum of RTDs, $RTD_{SUMRefined}$, is given by Equation 1:

$$RTD_{SUMRefined} = RTD_{SUM} - SCLK_{PRD} \times NTGLCNT_{SUM} \quad \text{Equation 1}$$

In some examples, a delay corresponding to zero, one, or negative one minimum delay elements (one least significant bit (LSB) of delay code) accrues in $RTD_{SUM}$ in each data frame. Accordingly, $RTD_{SUMRefined}$ may accumulate an error of up to plus or minus $2^M$ multiplied by the LSB of the delay code. In step 430, convert $RTD_{SUMRefined}$ to express delay with respect to a precise clock reference $CLK_{REF}$ to determine $RTD_{CLKREF}$. In some examples, the delay circuit 210 is sensitive to temperature and pressure, and the clock reference is independent of temperature and pressure.

In step 432, convert $RTD_{CLKREF}$ back to delay element terms, and drop M LSBs from the result to determine $RTD_{FINAL}$. Performing the step 430 conversion, then converting $RTD_{CLKREF}$ back into delay element terms, reduces or eliminates temperature and pressure dependency of the resulting delay code. Dropping M LSBs gives an average RTD across the $2^M$ data frames, and also averages error to less than or equal to one LSB—as described, the error in $RTD_{SUMRefined}$ is accumulated in the M LSBs of $RTD_{SUMRefined}$ (up to one LSB of error per data frame over $2^M$ data frames). A resulting total error in $RTD_{FINAL}$ is less than or equal to one LSB.

In step 434, determine whether a magnitude of a difference between $\text{RTD}_{FINAL}$ and $\text{RTD}_{CURRENT}$ is greater than a threshold. If so, then in step 436, $\text{RTD}_{FINAL}$ replaces $\text{RTD}_{CURRENT}$ for sampling MISO data signals from the corresponding SPI subnode 104. Otherwise, in step 438, $\text{RTD}_{CURRENT}$ continues to be used for sampling MISO data signals from the corresponding SPI subnode 104. In some examples, the new $\text{RTD}_{FINAL}$ code replaces $\text{RTD}_{CURRENT}$, or is used in a weighted sum with $\text{RTD}_{CURRENT}$ to derive a next delay code. In some examples, a weighted sum can be used to limit an amount of change in delay per iteration of the maintenance delay calibration process 422. In some examples, a cap on change in delay per iteration of the process 422 can be used for this (limiting) purpose.

Figure 5:
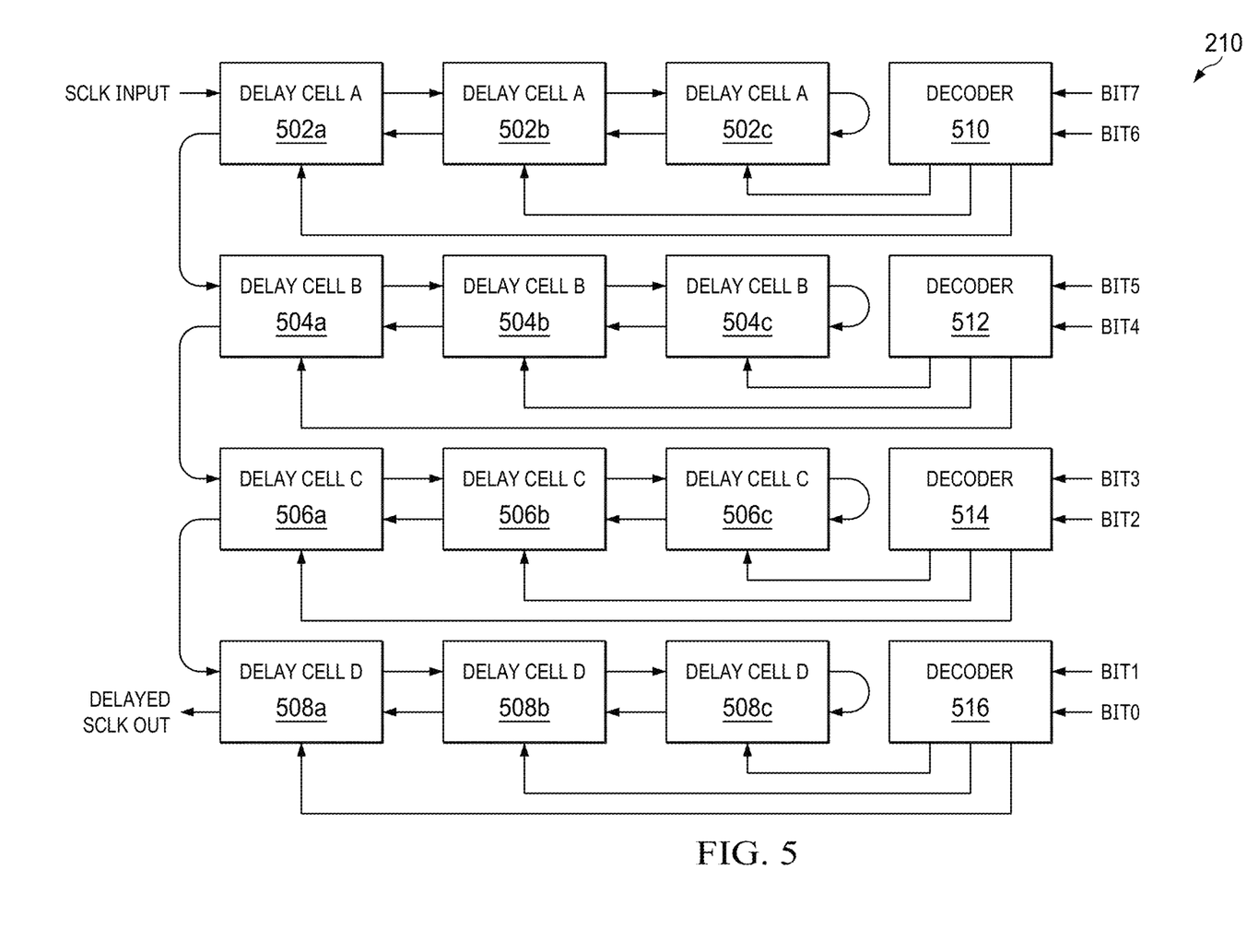
FIG. 5 is a functional block diagram of an example delay circuit as shown in FIG. 2.

FIG. 5 is a functional block diagram of an example delay circuit 210 as shown in FIG. 2. The delay circuit includes three delay cell A 502, three delay cell B 504, three delay cell C 506, and three delay cell D 508, a first decoder 510, a second decoder 512, a third decoder 514, and a fourth decoder 516. The three delay cells A 502 include a first delay cell A 502*a*, a second delay cell A 502*b*, and a third delay cell A 502*c*. The three delay cells B 504 include a first delay cell B 504*a*, a second delay cell B 504*b*, and a third delay cell B 504*c*. The three delay cells C 506 include a first delay cell C 506*a*, a second delay cell C 506*b*, and a third delay cell C 506*c*. The three delay cells D 508 include a first delay cell D 508*a*, a second delay cell D 508*b*, and a third delay cell D 508*c*.

An SCLK input line is connected to the clock input of the delay circuit 210. As described above, the clock input of the delay circuit 210 is connected to the SCLK output of the transmitter 208, and receives the SCLK signal. The SCLK input line is also connected to a first input of the first delay cell A 502*a*.

A first output of the first delay cell A 502*a* is connected to a first input of the second delay cell A 502*b*, and a second output of the second delay cell A 502*b* is connected to a second input of the first delay cell A 502*a*. A first output of the second delay cell A 502*b* is connected to a first input of the third delay cell A 502*c*, and a second output of the third delay cell A 502*c* is connected to a second input of the second delay cell A 502*b*. A first output of the third delay cell A 502*c* is connected to a second input of the third delay cell A 502*c*. A second output of the first delay cell A 502*a* is connected to a first input of the first delay cell B 504*a*.

A first output of the first delay cell B 504*a* is connected to a first input of the second delay cell B 504*b*, and a second output of the second delay cell B 504*b* is connected to a second input of the first delay cell B 504*a*. A first output of the second delay cell B 504*b* is connected to a first input of the third delay cell B 504*c*, and a second output of the third delay cell B 504*c* is connected to a second input of the second delay cell B 504*b*. A first output of the third delay cell B 504*c* is connected to a second input of the third delay cell B 504*c*. A second output of the first delay cell B 504*a* is connected to a first input of the first delay cell C 506*a*.

A first output of the first delay cell C 506*a* is connected to a first input of the second delay cell C 506*b*, and a second output of the second delay cell C 506*b* is connected to a second input of the first delay cell C 506*a*. A first output of the second delay cell C 506*b* is connected to a first input of the third delay cell C 506*c*, and a second output of the third delay cell C 506*c* is connected to a second input of the second delay cell C 506*b*. A first output of the third delay cell C 506*c* is connected to a second input of the third delay cell C 506*c*. A second output of the first delay cell C 506*a* is connected to a first input of the first delay cell D 508*a*.

A first output of the first delay cell D 508*a* is connected to a first input of the second delay cell D 508*b*, and a second output of the second delay cell D 508*b* is connected to a second input of the first delay cell D 508*a*. A first output of the second delay cell D 508*b* is connected to a first input of the third delay cell D 508*c*, and a second output of the third delay cell D 508*c* is connected to a second input of the second delay cell D 508*b*. A first output of the third delay cell D 508*c* is connected to a second input of the third delay cell D 508*c*. A second output of the first delay cell D 508*a* is connected to a delayed SCLK output line. The delayed SCLK output line is connected to the output of the delay circuit 210. As described above, the output of the delay circuit 210 is connected to the clock input of the receiver 212.

The first decoder 510 receives a first input Bit7 and a second input Bit6. A first output of the first decoder 510 is connected to a control input of the first delay cell A 502*a*, a second output of the first decoder 510 is connected to a control input of the second delay cell A 502*b*, and a third output of the first decoder 510 is connected to a control input of the third delay cell A 502*c*.

The second decoder 512 receives a first input Bit5 and a second input Bit4. A first output of the second decoder 512 is connected to a control input of the first delay cell B 504*a*, a second output of the second decoder 512 is connected to a control input of the second delay cell B 504*b*, and a third output of the second decoder 512 is connected to a control input of the third delay cell B 504*c*.

The third decoder 514 receives a first input Bit3 and a second input Bit2. A first output of the third decoder 514 is connected to a control input of the first delay cell C 506*a*, a second output of the third decoder 514 is connected to a control input of the second delay cell C 506*b*, and a third output of the third decoder 514 is connected to a control input of the third delay cell C 506*c*.

The fourth decoder 516 receives a first input Bit1 and a second input Bit0. A first output of the fourth decoder 516 is connected to a control input of the first delay cell D 508*a*, a second output of the fourth decoder 516 connected to a control input of the second delay cell D 508*b*, and a third output of the fourth decoder 516 is connected to a control input of the third delay cell D 508*c*.

The processor 202 provides a delay code, such as an eight bit delay code, namely bits B0, . . . , B7, to the delay circuit 210 in response to an RTD determined by the process 400 and/or the process 422. The delay code specifies the determined RTD. The delay code selects a number of delay cells 502, 504, 506, and/or 508 to activate. The fourth decoder 516 decodes Bit0 and Bit1 into control signals for delay cells D 508, the third decoder 514 decodes Bit2 and Bit3 into control signals for delay cells C 506, the second decoder 512 decodes Bit4 and Bit5 into control signals for delay cells B 504, and the first decoder 510 decodes Bit6 and Bit7 into control signals for delay cells A 502. The control signals determine which delay cells 502, 504, 506, and/or 508 are activated to apply corresponding delay to the SCLK signal.

For example, if Bit0 and Bit1 equal zero, then no delay cells D 508 are activated. If Bit0 equals one and Bit1 equals zero, then the first delay cell D 508*a* is activated and the second and third delay cells D 508*b* and 508*c* are deactivated. If Bit0 equals zero and Bit1 equals one, then the first and second delay cells D 508*a* and 508*b* are activated, and the third delay cell D 508*c* is deactivated. If Bit0 equals one and Bit1 equals one, then the first, second, and third delay cells D 508*a*, 508*b*, and 508*c* are activated. The other decoders 510, 512, and 514 and delay cells 502, 504, and 506 function similarly. Accordingly, pairs of delay code bits received by corresponding decoders 510, 512, 514, and 516 correspond to a count, from left to right (as illustrated), of delay cells 502, 504, 506, and/or 508 to be activated. Thus, the delay code specifies which of the delay cells 502, 504, 506, and/or 508 are to be activated, and which are to be deactivated. In some examples, lower numbered bits, such as Bit0, correspond to LSBs of a delay code or of an RTD expressed in binary, and higher numbered bits, such as Bit7, correspond to most significant bits (MSBs) of the delay code or the binary-expressed RTD.

An activated delay cell 502, 504, 506, or 508 contributes an amount of delay to an SCLK signal received at its first input (from the left) and outputs the delayed SCLK signal at its first output (to the right). The activated delay cell 502, 504, 506, or 508 also contributes an amount of delay to an SCLK signal received at its second input (from the right) and outputs the delayed SCLK signal at its second output (to the left). Accordingly, the activated delay cell 502, 504, 506, or 508 contributes a delay to an SCLK signal each time the SCLK signal passes through the delay cell 502, 504, 506, and 508. A delay cell 502, 504, 506, and 508 that is deactivated receives an SCLK signal at its first input (from the left) and outputs the SCLK signal, unmodified, at its second output (to the left).

In some examples, each of delay cells A 502 provide a same first amount of delay, each of delay cells B 504 provide a same second amount of delay, each of delay cells C 506 provide a same third amount of delay, and each of delay cells D 508 provide a same fourth amount of delay. The first, second, third, and fourth amounts of delay are different from each other.

In an example, the first amount of delay is 12800 ps, the second amount of delay is 3200 ps, the third amount of delay is 800 ps, and the fourth amount of delay is 200 picoseconds (ps). Accordingly, delay cells A 502 together provide up to 38400 ps delay, delay cells B 504 together provide up to 9600 ps delay, delay cells C 506 together provide up to 2400 ps delay, and delay cells D 508 together provide up to 600 ps delay. In the example, the delay circuit 210 provides delay with a granularity of 200 ps, and can provide delay of up to 51 nanoseconds, with delay cells providing delays ranging from very coarse to very fine. Accordingly, the delay circuit 210 enables a wide, asynchronously programmable delay range with fine granularity.

Figure 6:
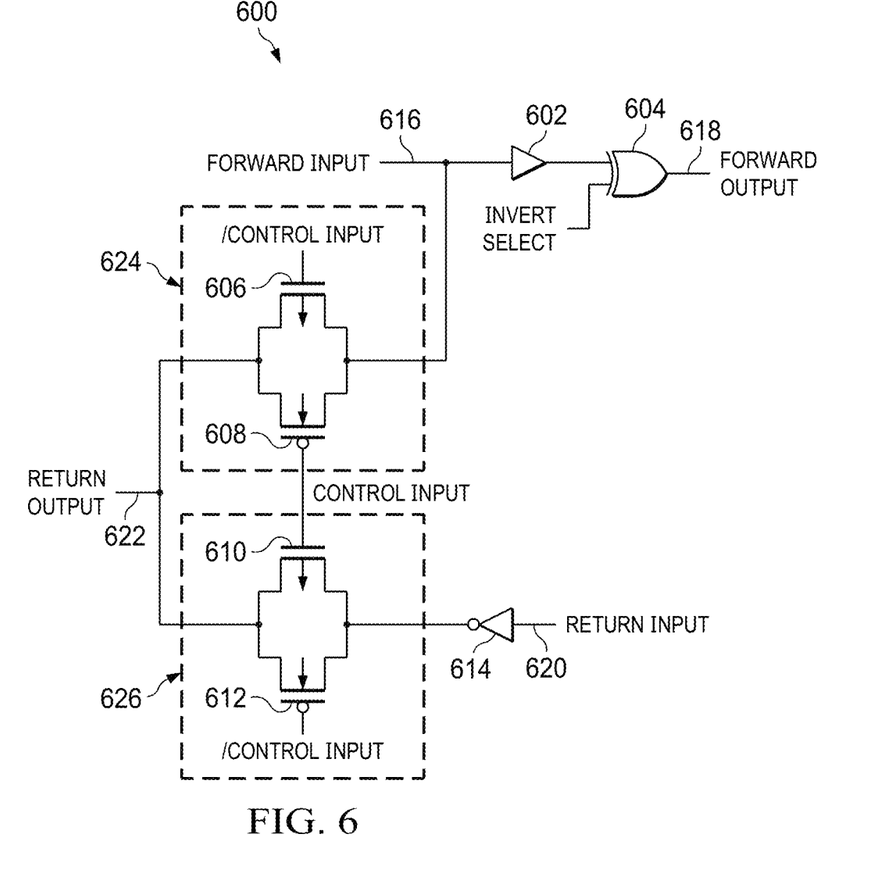
FIG. 6 is a circuit and functional block diagram of an example delay cell as shown in FIG. 5.

FIG. 6 is a circuit and functional block diagram of an example delay cell 600 as shown in FIG. 5. Accordingly, the delay cell 600 represents an example of a delay cell A 502, a delay cell B 504, a delay cell C 506, or a delay cell D 508. The delay cell 600 includes a buffer 602, an XOR logic gate 604, a first n-channel metal-oxide-semiconductor field-effect transistor (MOSFET) (first NMOS) 606, a first p-channel MOSFET (first PMOS) 608, a second n-channel MOSFET (second NMOS) 610, a second p-channel MOSFET (second PMOS) 612, and an inverter 614 (an inverting buffer).

External inputs and outputs of the delay cell 600 correspond to the external inputs and outputs of the delay cells 502, 504, 506, and 508 as described with respect to FIG. 5. In some examples, decoders 510, 512, 514, and 516 also provide Invert Select signals to respective delay cells 600, and include corresponding connections to respective delay cells 600 for that purpose. A forward input 616 is connected to a first input of the delay cell 600, a forward output 618 is connected to a first output of the delay cell 600, a return input 620 is connected to a second input of the delay cell 600, and a return output 622 is connected to a second output of the delay cell 600.

The forward input 616 is connected to an input of the buffer 602, a first terminal of the first NMOS 606, and a first terminal of the first PMOS 608. A second terminal of the first NMOS 606 is connected to a second terminal of the first PMOS 608, the return output 622, a first terminal of the second NMOS 610, and a first terminal of the second PMOS 612. A second terminal of the second NMOS 610 is connected to a second terminal of the second PMOS 612 and to an output of the inverter 614.

A control terminal of the first NMOS 606 and a control terminal of the second PMOS 612 are connected to the control input of the delay cell 600 via an inverter (not shown), so that the control terminals receive an inverted signal (/Control Input) from the control input of the delay cell 600. A control terminal of the first PMOS 608 and a control terminal of the second NMOS 610 are connected to the control input of the delay cell 600, so that the control terminals receive a non-inverted signal (Control Input) from the control input of the delay cell 600. The control terminal of the first PMOS 608 is connected to the control terminal of the second NMOS 610. Accordingly, the first and second transistors 606 and 608 together are a first pass gate 624, and the third and fourth transistors 610 and 612 together are a second pass gate 626.

An input of the inverter 614 is connected to the return input 620. An output of the buffer 602 is connected to a first input of the XOR logic gate 604. A second input of the XOR logic gate 604 receives an Invert Select signal. An output of the XOR logic gate 604 is connected to the forward output 618.

The first pass gate 624 turns on (conducts) and the second pass gate 626 turns off (does not conduct) when the control input receives a low voltage signal such as a logic zero. The first pass gate 624 turns off and the second pass gate 626 turns on when the control input receives a high voltage signal such as a logic one. Accordingly, when the control input receives a logic zero, deactivating the delay cell 600, the second pass gate 626 turns off and the first pass gate 624 turns on, shorting the forward input 616 to the return output 622. When the control input receives a logic one, activating the delay cell 600, the first pass gate 624 turns off and the second pass gate 626 turns on, connecting an inverted state of the return input 620 to the return output 622.

While the delay cell 600 is on, the SCLK signal transits the delay circuit 600 in two directions: from the forward input 616 to the forward output 618 (first input to first output) in a first transit direction, and from the return input 620 to the return output 622 (second input to second output) in a second transit direction. This enables the SCLK signal to pass through the buffer 602 and the XOR logic gate 604 in the first transit direction, and through the inverter 614 in the second transit direction, to receive delay contributions from each of these components.

The Invert Select signal is set to a logic one during normal operation, so that the SCLK signal is inverted by the XOR logic gate 604 in the first transit direction, and inverted again by the inverter 614 in the second transit direction. Accordingly, during a bidirectional transit from the forward input 616 to the return output 622, the SCLK signal is not inverted. In some examples, the Invert Select signal can be set to a logic zero so that the SCLK signal is inverted by a bidirectional transit. In some examples, the XOR logic gate 604 is used to enable additional fine control of delay provided by a delay cell 600.

Modifications are possible in the described examples, and other examples are possible within the scope of the claims.

In some examples, different numbers of delay cells, and corresponding numbers of control bits, are used than in the described examples.

In some examples, the processor 202 provides programming codes to delay cells and/or adjusts delay cell weights.

In some examples, an SPI main 102 or an SPI subnode 104 includes a processor such as a central processing unit (CPU), a digital signal processor (DSP), or a microcontroller.

In some examples, processes described herein are controlled using hardware, software, or a combination thereof.

In some examples, the processor 202 is used to control delay calibration.

In some examples, a middle delay (or duration) between the upper and lower bounds, other than the midpoint delay, is used for a binary search.

In some examples, the amount of delay provided by an individual delay cell can be programmed or otherwise determined using hardware, software, or a combination.

In some examples, a daisy chain layout can also be used to connect an SPI main 102 with multiple SPI subnodes 104. In some examples, systems and processes described above can be used to calibrate RTD for a daisy chain SPI layout.

In some examples, hardware or software of an SPI subnode 104 enables providing a minimum code (all zeroes), maximum code (all ones), or mid-code (a zero followed by ones, or a one followed by zeroes) MISO response signal. The p minus one iteration MISO data signal is compared to this predetermined response code (rather than the p iteration MISO data signal) to determine RTD. In some examples, a MOSI data signal is provided to trigger this response code.

In some examples, the described methods and systems are used to calibrate a delay compensation host (controller/main) of an RTD-based interface, other than an SPI main 102.

In some examples, the calibration control circuit 209 is part of the processor 202.

In some examples, the delay circuit 210 is part of the calibration control circuit 209.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples maybe included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

What is claimed is:

1. A device comprising:
a transmitter configured to transmit a clock signal;
a receiver configured to receive a response signal; and
a control circuit coupled to the receiver and coupled to the transmitter, wherein the control circuit is configured to:
cause the transmitter to transmit a first clock signal with a first clock period;
cause the transmitter to transmit a second clock signal with a second clock period greater than the first clock period;
determine whether a first pattern of a signal responsive to the first clock signal is the same as a second pattern of a signal responsive to the second clock period;
delay the clock signal with a delay responsive to the first clock period to generate a delayed clock signal, in response to the determine action determining the first and second patterns are the same; and
cause the receiver to sample the response signal using the delayed clock signal.

2. The device of claim 1,
wherein the control circuit has a clock input and an output and includes multiple decoders and multiple sets of multiple delay cells, the clock input coupled to the transmitter and the output coupled to the receiver;
wherein ones of the delay cells have a respective control input, and are connected sequentially between the clock input of the control circuit and the output of the control circuit; and
wherein ones of the decoders have multiple outputs, different ones of the outputs of ones of the decoders connected to the control input of different delay cells of a corresponding one of the sets of the delay cells.

3. The device of claim 1, wherein the control circuit includes multiple delay cells, ones of the delay cells including:
a first pass gate having an input, an output, a first control terminal, and a second control terminal;
a second pass gate having an input, an output, a first control terminal coupled to the first control terminal of the first pass gate, and a second control terminal coupled to the second control terminal of the first pass gate;
a first buffer having an input coupled to the input of the first pass gate; and
a second buffer having an output coupled to the input of the second pass gate.

4. The device of claim 1, wherein the transmitter has a chip select output, and the control circuit is configured to control the transmitter to provide a chip select signal at the chip select output so that the chip select signal uniquely corresponds to an integrated circuit distinct from the device.

5. The device of claim 1,
wherein the transmitter has a control input and a clock output;
wherein the control circuit includes a calibration circuit and a delay circuit;
wherein the calibration circuit has a clock input, a data input, a first control output, and a second control output, the clock input of the calibration circuit coupled to the clock output of the transmitter, and the first control output of the calibration circuit coupled to the control input of the transmitter;

wherein the delay circuit has a control input, a clock input, and an output, the control input of the delay circuit coupled to the second control output of the calibration circuit, the clock input of the delay circuit coupled to the clock output of the transmitter, the output of the delay circuit coupled to the clock input of the receiver; and
wherein the receiver has a data input and a clock input, the data input of the receiver coupled to the data input of the calibration circuit, and the clock input of the receiver coupled to the output of the delay circuit.

6. The device of claim 5, further comprising a data pin and a clock pin;
wherein the clock output of the transmitter is coupled to the clock pin; and
wherein the data input of the receiver is coupled to the data pin.

7. The device of claim 1, wherein the control circuit is configured to, in response to the first and second patterns not matching, repeat the cause the transmitter to transmit a first clock signal action and the cause the transmitter to transmit a second clock signal action, with the first clock signal replaced by the second clock signal, and the second clock signal replaced by a third clock signal with a third clock period greater than the second clock period.

8. The device of claim 7, wherein the control circuit is configured to, in response to a pattern responsive to the second clock signal being the same as a pattern responsive to the third clock signal, search between the first clock period and the second clock period for a round trip delay.

9. The device of claim 8, wherein the search is a sequential search or a binary search.

10. The device of claim 1, wherein a duration of the second clock period is twice a duration of the first clock period.

11. The device of claim 1, wherein the device is a serial peripheral interface main.

12. A method of operating an integrated circuit (IC), the method comprising:
transmitting a first clock signal with a first clock period;
receiving a first response signal responsive to the first clock signal;
transmitting a second clock signal with a second clock period greater than the first clock period;
receiving a second response signal responsive to the second clock signal;
determining whether a first pattern of the first response signal is the same as a second pattern of the second response signal;
transmitting a normal operation clock signal;
delaying the normal operation clock signal with a delay responsive to the first clock period to generate a delayed clock signal, in response to the determining;
receiving a normal operation response signal responsive to the normal operation clock signal; and
sampling the normal operation response signal using the delayed clock signal.

13. The method of claim 12, further comprising, prior to the transmitting the first clock signal, asserting a chip select signal corresponding to a selected one of multiple distinct integrated circuits (ICs), so that the first and second response signals correspond to the selected IC;
wherein the delay corresponds to a round trip delay between transmitting a leading edge of the first clock signal to the selected IC and receiving the first response signal.

14. The method of claim 12, further comprising:
transmitting a number M clock signals corresponding to M data frames, the clock signals having a clock period;
prior to transmitting each of the clock signals, asserting a chip select signal corresponding to a selected one of multiple distinct integrated circuits (ICs);
receiving M response signals, different ones of the response signals corresponding to different instances of the asserting;
counting a duration from each instance of asserting of the chip select signal to receipt of a first data toggle of each corresponding response signal, and summing the durations to generate a sum;
subtracting from the sum a product between the clock period and a sum of the numbers of leading bits of the response signals without a data toggle, to generate a refined sum;
sampling a subsequent response signal in response to the refined sum in response to a magnitude of a difference between the delay and a value responsive to the refined sum being greater than a threshold.

15. The method of claim 12, further comprising:
in response to the first and second patterns not matching, repeating transmitting the first clock signal, receiving the first response signal, transmitting the second clock signal, receiving the second response signal, and determining, with the first clock signal replaced by the second clock signal, and the second clock signal replaced by a third clock signal with a third clock period greater than the second clock period.

16. The method of claim 15, further comprising, in response to a pattern responsive to the second clock signal being the same as a pattern responsive to the third clock signal, searching between the first clock period and the second clock period for a round trip delay.

17. The method of claim 16, wherein the search is a sequential search or a binary search.

18. The method of claim 15, wherein the first clock period is CLK1 and the second clock period is CLK2, and wherein the delayed clock signal is a first delayed clock signal, further comprising:
transmitting a clock signal with clock period CLK1;
delaying the clock signal by CLK1+k×delay granularity to generate a second delayed clock signal, where k is an integer, delay granularity is a delay increment, a range of k is between one and (CLK2−CLK1)/delay granularity, and k is initially either its minimum or maximum value;
receiving a responsive signal and sampling the responsive signal in response to the second delayed clock signal;
repeating the transmitting, the receiving, and the delaying, while iterating k upward one from its minimum value or downward one from its maximum value;
determining whether a pattern of the responsive signal for each value of k has one more bit prior to a first data toggle than a pattern of the responsive signal for each corresponding value of k+1, and if so, determining whether the pattern of the responsive signal for k+1 matches a pattern of the responsive signal for k+2;
in response to a value of k for which the determining is affirmative (a number M), sampling a response signal responsive to a delay corresponding to CLK1+(M+1)× delay granularity.

19. The method of claim 15, wherein the first clock period is a lower bound and the second clock period is an upper bound, and wherein the delayed clock signal is a first delayed clock signal, further comprising:
transmitting a clock signal with the first clock period;
delaying the clock signal by a middle duration between the lower bound and the upper bound to generate a second delayed clock signal;
receiving a middle responsive signal and sampling the responsive signal in response to the second delayed clock signal;
determining a first case or a second case, the first case corresponding to a pattern of the middle responsive signal having one more bit before a first data toggle than a pattern of a responsive signal corresponding to the upper bound, and the second case corresponding to a pattern of a responsive signal corresponding to the lower bound having one more bit before a first data toggle than the pattern of the middle responsive signal;
sampling a response signal responsive to a delay between the lower bound and the middle duration in response to the first case;
sampling a response signal responsive to a delay between the middle duration and the upper bound in response to the second case.

20. The method of claim 12, wherein a duration of the second clock period is twice a duration of the first clock period.

* * * * *